Jan. 12, 1960     K. REICHERT     2,920,484
GAGE FOR LIQUIDS
Filed Aug. 16, 1955
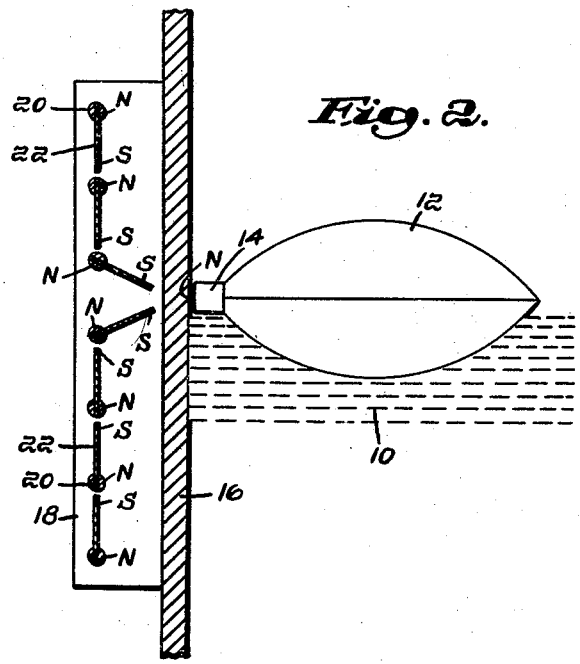
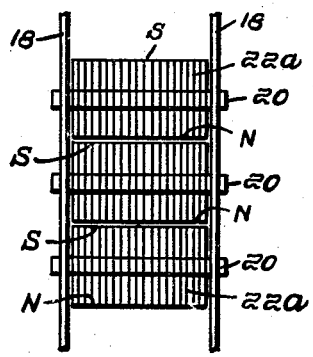
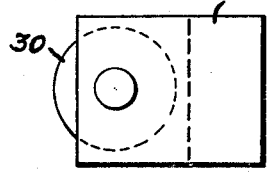
Inventor:
Kurt Reichert,
by Emery, Booth, Townsend
Miller & Widner Att'ys United States Patent Office 2,920,484
Patented Jan. 12, 1960

2,920,484

GAGE FOR LIQUIDS

Kurt Reichert, Langen, Hessen, Germany, assignor to Phonix-Armaturen-Werk, Bregel K.G., Frankfurt am Main Rodelheim, Germany, a German company Application August 16, 1955, Serial No. 528,791

6 Claims. (Cl. 73—319)

This invention relates to an indicating gage for showing the level of a liquid, and more particularly to a gage of the type wherein a float rests on the surface of the liquid and carries a magnet which traverses the inner surface of a wall of the container and actuates indicating means exterior thereto.

The object of the invention is to provide a gage of this type embodying an improved form of indicating means which will give an indication showing a conspicuous contrast of two areas, one below the level and one above.

The invention will be well understood by reference to the following description taken in connection with the illustrative embodiments thereof shown in the accompanying drawings wherein:

Fig. 1 is a schematic front elevation of the indicating means;

Fig. 2 is a vertical section through Fig. 1, showing the indicating means organized at the exterior of a container wall at the interior of which is the float-supported magnet;

Fig. 3 is a view corresponding to Fig. 1 showing a modification; and

Fig. 4 is a modification on the magnet.

Referring to Fig. 2 there is there shown a column of liquid 10 carrying a float 12 which supports a magnet 14 in such a manner that as the level of the liquid fluctuates the magnet moves proportionately along the inner surface of the wall 16 of the liquid container, which wall it will be understood is of non-magnetic material, and the magnet actuates the exterior indicating means in a manner which will be described.

The indicating means may be conveniently termed a shutter, because it resembles a shutter or blind as used in a window and one of the type having pivoted slats or louvers. It may comprise two side members 18 which provide bearings for the trunnions 20 of a series of slats 22. These slats 22 are thin, light elements of considerable surface area, and in the modification of Figs. 1 and 2 the trunnions are at one edge, so that the slats tend to hang down from their horizontal axes in a plane parallel to and along the path of the magnet 14 as shown at the upper portion of Fig. 2. They may however be reversed about their axes by the action of the magnet as seen at the lower portion of Fig. 2, and suitable means are provided for holding them in one or the other position except when they are moved therefrom and reversed by the tractive action of the magnet.

The opposite surfaces of the slats are of conspicuously different appearance and herein the lining at the upper end of Fig. 1 conventionally indicates one color, and at the bottom part of Fig. 1 and Fig. 3 a contrasting color, the contrasting colors being at opposite faces of the slats. The successive axes of the slats are spaced by a distance substantially equal to the width of the slats so that when the slats are in one or the other vertical position the horizontal edges will lie in close position with the slight spaces between them to form a substantially continuous shutter and, when magnetic forces are used to retain the slats in the vertical positions, a minimum air gap.

Each slat opposite the path of the magnet 14 provides an armature to be attracted thereby. Looking at Fig. 2, assume the three lower slats are in the position shown with their faces colored as diagrammed by vertical lines to the left and the two upper slats in the reverse position, with their faces contrastingly colored as diagrammed by horizontal broken lines to the left. Never mind how they got that way for the moment. The edges of the two slats between are inclined toward the magnet and we may consider that the lower one of them has been swung counterclockwise to the position shown as the magnet moved up past the same, and the one above similarly swung counterclockwise. If an upward movement continues the lower of these slats will tend to assume a vertical position, extending upward from its trunnions like the ones below, and then the second of the slats, the next above slat, will be moved counterclockwise to the vertical position in the same manner. When the magnet reaches the top of the column all the slats will be reversed, and as it descends again, they will all be reversed again, and if the magnet is at the bottom of the column all the slats will show the faces the color of which is diagrammed by broken horizontal lines.

Suitable means are provided for maintaining the slats in one or the other of their vertical positions, except when moved therefrom by the overpowering force of the magnet 14, which is strong, as indeed it must be, because of the air gap involved. The slats may be magnetized to have, at least during the operation of the device, for instance, a north pole along one of their longitudinal edges and a south pole along the other edge, and the south pole will respond to the north pole, as marked, of the magnet 14, so that when the north pole of the magnet is opposite a slat it will attract the south pole of the slat as shown at the center of Fig. 2. In other words the slats in operation are in the nature of bar magnets with the magnetic axes transverse to the horizontal pivotal axes. The slats may be permanently magnetized prior to their assembly in the structure.

In Fig. 3 a modification of the invention is shown in which the slats 20a are pivoted on horizontal axes along their center lines. This permits the distance between the slats and the magnet 14 to be reduced so that the latter exerts a great attractive force.

Fig. 4 illustrates an auxiliary steel roller 30 attached to the magnet 12a. Thus, the magnet is prevented from rubbing against the container wall. Also, the effective magnetic pole is made to pass as closely as possible to the swinging plates. In this case, the magnet 12a has been extended by means of the roller 30.

It will be apparent that various changes and modifications may be made in the construction shown without departing from the invention as defined in the following claims.

I claim:

1. Liquid level indicating means for liquid containers comprising a float resting on the liquid, a magnet moved by the float along a determined path proportionately to changes in liquid level, and, exterior to the container, a shutter extending in a plane parallel to and along the length of said path, which plane intersects the field of the magnet, the shutter comprising a series of slats of substantial surface area pivoted at their ends to turn about axes transverse to said path, the successive axes being spaced by a distance substantially equal to the width of a slat whereby the horizontal edges of successive slats in vertical position will lie in close opposition with at most a slight space only between them to form a substantially continuous shutter, at least portions of the slats being magnetized to provide along one or more vertical zones portions of the opposite horizontal edges of the slats of opposite polarity, the tractive force of a slat being less than that of the float-carried magnet, the opposite surface areas of the slats being of conspicuously different appearance, whereby on traverse of the magnet vertically along the shutter the slats are reversed and those below its instant position delineate an area different in appearance from the area above.

2. Indicating means as in claim 1 wherein the slats are pivoted on axes which are substantially half way between their horizontal edges.

3. Liquid level indicating means for liquid containers comprising a float resting on the liquid, a magnet moved by the float along a determined path proportionately to changes in liquid level, and, exterior to the container, a shutter extending in a plane parallel to and along the length of said path, which plane intersects the field of the magnet, the shutter comprising a series of slats of substantial surface area pivoted at their ends to turn about axes transverse to said path, the successive axes being spaced by a distance substantially equal to the width of a slat whereby the horizontal edges of successive slats in vertical position will lie in close opposition with at most a slight space only between them to form a substantially continuous shutter, magnetic means associated with the shutter providing in its plane magnetic tractive forces between the longitudinal edges of the slats of lesser strength than the force exerted by the magnet to hold the slats in their approximated vertical positions when removed from the field of said magnet, at least the portion of the edges of the slats opposite the path of the magnet being paramagnetic to provide an armature attracted by the field of the magnet and to be moved from the plane of the shutter and turned past horizontal as the field moves vertically past the slat pivot line, the opposite surface areas of the slats being of conspicuously different appearance, whereby on traverse of the magnet vertically along the shutter the slats are reversed and those below its instant position delineate an area different in appearance from the area above.

4. Means for indicating the instant value of a variable condition comprising a shutter formed of a vertical series of slats of substantial surface area pivoted at their ends to turn about horizontal axes, the slats being at least in part paramagnetic to provide for positioning the same about their axes by magnetic forces exerted thereon eccentrically to such axes, the successive axes being spaced by a distance substantially equal to the width of a slat whereby the horizontal edges of successive slats in vertical position will be in close opposition to form a substantially continuous shutter, the opposite surface areas of the slats being of conspicuously different surface appearance, means for causing a relatively strong magnetic field to move proportionately to the changes in the variable condition along the shutter at one side thereof to attract the edge portions of the slats, which slats when not under the influence of the said magnetic field are maintained vertical by weaker magnetic fields in the shutter plane at the edge portions of the slats.

5. Means for indicating the value of a variable condition comprising a shutter formed of a vertical series of slats of substantial surface area pivoted at their ends to be turned about horizontal axes through an angle of 180° measured in a plane perpendicular to the axes, such turning providing for alternative presentation of the two surfaces toward the front, means for normally maintaining the slats in vertical position when not influenced by the extraneous displacing force of the strong magnetic field hereinafter referred to, said means being yieldable to the superior displacing force of that field to release the slats for movement about their axes, the opposite surface areas of the slats being of conspicuously different surface appearance, the areas of adjacent slats in a vertical position presenting in cooperation a substantially continuous surface to an observer, means for causing a strong magnetic field to move proportionately to the changes in the variable condition in a vertical path along one side of the shutter, at least portions of the slats opposite said path providing an armature to respond to the attraction of the field and provide for the reversal of the slats as the field moves past the same.

6. Liquid level gage comprising a float to follow the level of the liquid in a container, a permanent magnet of relatively great strength carried by the float, a series of individual magnets of lesser strength outside the container, the individual magnets being constituted by plates, means to support the individual or plate-shaped magnets in a plane extending longitudinally of the directions in which the float-carried magnet changes its position, the plate-shaped magnets being mounted for swinging movement about parallel horizontal axes and having two surfaces of distinctly different appearance, the plates, when disposed with their edges in opposition mutually attracting one another and, when under the influence of their mutual attraction only, forming a wall and presenting on one side surfaces of the same appearance, the plates, when the float-carried magnet is intermediate the highest possible and the lowest possible level, forming a wall presenting surfaces of one appearance above the level and a separate wall presenting surfaces of the other appearance below the level, the plates in the approximate height of the level, when the float-carried magnet is in an intermediate position, being turned about their axes in response to the attraction of the float-carried magnet.

References Cited in the file of this patent

UNITED STATES PATENTS

| | | |
|---|---|---|
| 530,592 | Kleritj | Dec. 11, 1894 |
| 1,040,127 | Bonesteel | Oct. 1, 1912 |
| 1,617,287 | Huggins | Feb. 8, 1927 |
| 1,723,172 | Huggins | Aug. 6, 1929 |
| 2,233,572 | Atkins | Mar. 4, 1941 |

FOREIGN PATENTS

| | | |
|---|---|---|
| 841,953 | Germany | July 29, 1954 |